(12) United States Patent
Longo et al.

(10) Patent No.: US 10,651,673 B2
(45) Date of Patent: May 12, 2020

(54) FLAMELESS CANDLE, MAGNETIC RESONANCE CHARGING SYSTEM, AND ASSOCIATED METHODS

(71) Applicant: Hollowick Inc., Manlius, NY (US)

(72) Inventors: Robert Longo, Manlius, NY (US); Joel C. Nye, Hamburg, NY (US); Jeffrey A. Miller, St. Paul, MN (US); Timothy Paul Cowley, Windsor (GB); Hong Wah Hau, Hong Kong (CN)

(73) Assignee: Hollowick Inc., Manlius, NY (US)

( * ) Notice: Subject to any disclaimer, the term of this patent is extended or adjusted under 35 U.S.C. 154(b) by 130 days.

(21) Appl. No.: 15/788,450

(22) Filed: Oct. 19, 2017

(65) Prior Publication Data
US 2019/0123576 A1 Apr. 25, 2019

(51) Int. Cl.
| | |
|---|---|
| *H01M 10/46* | (2006.01) |
| *H02J 7/02* | (2016.01) |
| *F21S 9/02* | (2006.01) |
| *F21V 23/04* | (2006.01) |
| *H02J 50/10* | (2016.01) |
| *F21V 23/06* | (2006.01) |
| *H02J 50/12* | (2016.01) |
| *H02J 7/00* | (2006.01) |
| *F21Y 115/10* | (2016.01) |
| *H02J 50/90* | (2016.01) |
| *F21S 10/04* | (2006.01) |

(52) U.S. Cl.
CPC .............. *H02J 7/025* (2013.01); *F21S 9/02* (2013.01); *F21V 23/04* (2013.01); *F21V 23/0435* (2013.01); *F21V 23/06* (2013.01); *H02J 7/0044* (2013.01); *H02J 50/10* (2016.02); *H02J 50/12* (2016.02); *F21S 10/04* (2013.01); *F21Y 2115/10* (2016.08); *H02J 7/0027* (2013.01); *H02J 7/0047* (2013.01); *H02J 50/90* (2016.02)

(58) Field of Classification Search
CPC .......... H02J 7/355; H02J 7/0042; H02J 7/025; H02J 50/10; H02J 50/12; F21S 10/04; H01K 7/06
USPC .................. 320/107, 108, 114, 115; 362/810
See application file for complete search history.

(56) References Cited

U.S. PATENT DOCUMENTS

| | | | | |
|---|---|---|---|---|
| 6,765,366 B2 * | 7/2004 | Maggert | ............... | H02J 7/0004 320/114 |
| 7,696,722 B2 * | 4/2010 | Utschig | .................... | A61B 6/56 320/114 |
| 8,058,837 B2 * | 11/2011 | Beers | ................... | A43B 1/0036 320/108 |
| 8,210,708 B2 | 7/2012 | Hau et al. | | |
| 8,449,135 B2 * | 5/2013 | Wright | ................... | B25B 23/18 320/107 |

(Continued)

*Primary Examiner* — Edward Tso
(74) *Attorney, Agent, or Firm* — Bond Schoeneck & King, PLLC; George McGuire

(57) ABSTRACT

The present invention provides a flameless candle, a flameless candle charging system, and methods for using the flameless candle charging system. The charging system generally includes a plurality of flames candles, a charging tray having a tray hollow body with a planar outwardly facing surface on which the plurality of flameless candles may be placed, and a metallic plate positioned within the hollow body, and a remote control for selectively operating the plurality of candles and including a body having a magnet positioned therein. The remote control may be magnetically attached to the charging tray by positioning the magnet in proximity to said metallic plate.

17 Claims, 17 Drawing Sheets

(56) References Cited

U.S. PATENT DOCUMENTS

| | | |
|---|---|---|
| 8,579,461 B2 | 11/2013 | Fournier et al. |
| 8,878,485 B2 | 11/2014 | Fournier et al. |
| D734,718 S | 7/2015 | Fournier et al. |
| D751,503 S | 3/2016 | Fournier et al. |
| 9,512,971 B2 | 12/2016 | Li |
| 9,518,710 B2 | 12/2016 | Li |
| 9,523,471 B2 | 12/2016 | Li |
| 9,551,470 B2 | 1/2017 | Li |
| 9,572,236 B2 | 2/2017 | Patton |
| 9,585,980 B1 | 3/2017 | Li |
| 9,605,824 B1 | 3/2017 | Li |
| 9,625,112 B2 | 4/2017 | Li |
| D786,484 S | 5/2017 | Patton et al. |
| 9,660,468 B2 | 5/2017 | Fournier et al. |
| 9,664,344 B2 | 5/2017 | Hau et al. |
| 9,689,538 B2 | 6/2017 | Hau et al. |
| 9,709,231 B2 | 7/2017 | Li |
| 9,735,609 B2 | 8/2017 | Velazquez |
| 9,739,432 B2 | 8/2017 | Li |
| 9,755,438 B2 | 9/2017 | Thompson |
| 2003/0146735 A1* | 8/2003 | Barbeau ............ F21L 2/00 320/114 |
| 2007/0182367 A1* | 8/2007 | Partovi ............ H01F 5/003 320/108 |
| 2010/0124050 A1 | 5/2010 | Hau et al. |
| 2011/0127959 A1* | 6/2011 | McGary ............ H02J 7/0027 320/114 |
| 2011/0317403 A1 | 12/2011 | Fournier |
| 2012/0287612 A1 | 11/2012 | Hau et al. |
| 2013/0154552 A1 | 6/2013 | Siessegger |
| 2014/0151079 A1* | 6/2014 | Furui ............ H02J 7/0042 173/46 |
| 2015/0377431 A1 | 12/2015 | Hau et al. |
| 2016/0099603 A1 | 4/2016 | Velazquez |
| 2016/0100924 A1* | 4/2016 | Wilson ............ A61C 19/02 206/63.5 |

* cited by examiner

FLAMELESS CANDLE, MAGNETIC RESONANCE CHARGING SYSTEM, AND ASSOCIATED METHODS

FIELD OF THE INVENTION

The present disclosure is directed generally to flameless candles, and more particularly to flameless candles having rechargeable power sources that are recharged via magnetic resonance.

BACKGROUND

Flameless candles are generally well known in the art. LEDs or similar illumination sources are positioned within a flame-shaped bulb on a candle shaped body. The illumination source can be powered by a rechargeable power source and can be actuated to emit a flickering type light or a constant flame type light, as desired by the user. While the most typical application for flameless candles is the restaurant industry where candle-lit tables are common and for safety reasons, using flameless lighting sources is preferred, home lighting and other applications are also common.

Traditional flameless candles come as part of a system with a charging tray that permits the candles to be stowed and charged when not in use. The current state of the art charging systems are inductive; eliminating the need for charging pins, and providing a charge for a lithium ion battery for up to 18 hours of continuous operation. These systems are easier to use than prior systems, but still have certain disadvantages. For example, the induction based systems need to have a ferrite rod, thereby making the charging media cumbersome; induction requires a relatively large charging coil, thus requiring larger candles that house the coil; and the induction charging is somewhat inefficient and the power consumption is relatively high.

Accordingly, there is a need in the art for flameless candles and charging system therefor that provides efficient charging, smaller candle sizes, lower power consumption, and more flexible charging apparatus.

SUMMARY

The present disclosure is directed to a flameless candle having a magnetic resonance core and a magnetic resonance charging system that charges multiple flameless candles at once.

According to an aspect, a flameless candle charging system comprises a plurality of flameless candles each comprising a candle hollow body in which is positioned a light emitting element, a magnet, a conductive coil, a power source, at least one circuit board programmed, structured and/or configured to transmit electricity to the light emitting element and provide energy to the power source, and a reed switch operable between normally open and selectively closed positions; and a charging tray comprising a tray hollow body having a planar outwardly facing surface on which the plurality of flameless candles may be placed, a plurality of transmitting coils disposed therein and arranged in a predetermined pattern within the tray hollow body, wherein each of the plurality of flameless candles is adapted to be positioned in axial alignment with a respective one of said transmitting coils, and a switch actuating magnet positioned within the tray hollow body and operable to move said reed switch between its open and closed positions when a flameless candle is placed in proximity thereto.

In an embodiment, the flameless candle charging system further comprises a remote control operable to control the plurality of flameless candles.

In an embodiment, the charging tray further comprises a remote control mounting area on the outwardly facing surface and a metallic plate disposed within the tray hollow body in axial alignment with said remote control mounting area.

In an embodiment, the remote control further comprises a magnet disposed therein, whereby placement of the remote control on the remote control mounting area magnetically attaches the remote control to said charging tray.

In an embodiment, the charging tray further comprises a plurality of metallic plates disposed within the tray hollow body and each one is positioned adjacent a respective one of the transmitting coils.

In an embodiment, the charging tray further comprises a top edge and a handle formed along the top edge.

In an embodiment, the charging tray further comprises a plurality of nubs that extend outwardly from the planar surface, each of the nubs being axially aligned with a respective one of the transmitting coils.

In an embodiment, the plurality of nubs is arranged in a series of parallel rows and parallel columns, wherein adjacent columns are laterally offset from one another.

In an embodiment, each of the plurality of candles further comprise a bottom in which a bored hole is formed, and whereupon when each of the plurality of candles is positioned on the planar surface of the charging tray with each of the nubs being adapted to engage a respective one of the bored holes.

In an embodiment, the flameless candle charging system further comprises at least one power distribution circuit disposed within the tray hollow body and adapted to distribute power to each of said the plurality of transmitting coils.

In an embodiment, the charging tray further comprises a charging port incorporated therein and adapted to transmit power to the at least one power distribution circuit.

In an embodiment, the flameless candle charging system further comprises a charging cable having an AC plug on one end thereof and a coupling jack adapted to engage with the charging port on its opposite end.

In an embodiment, the charging cable further comprises an indicator light that illuminates when power is being supplied to the charging tray.

In an embodiment, the coupling jack and said charging port magnetically couple to one another.

In an embodiment, each of the plurality of candles further comprises a remote sensor disposed therein.

In an embodiment, each of the plurality of candles further comprise at least one indicator lights disposed therein, whereby the at least one indicator lights provide visual indication of the charging status of said candle.

According to an aspect, a flameless candle comprises a hollow body, a light emitting element positioned within the hollow body, a magnet positioned within the hollow body, a conductive coil positioned within the hollow body, a power source positioned within the hollow body and in electrical communication with the conductive coil and the light emitting element, and at least one circuit board programmed, structured and/or configured to transmit electricity to the light emitting element and provide energy to the power source.

According to an aspect, a charging tray for charging a plurality of flameless candles having a magnetically actuated switch, comprises a tray hollow body having a planar upper and outwardly facing surface on which the plurality of flameless candles may be placed; a plurality of transmitting coils disposed therein and arranged in a predetermined pattern within the tray hollow body, wherein each of the plurality of flameless candles is adapted to be positioned in axial alignment with a respective one of the transmitting coils; and a switch actuating magnet positioned within the tray hollow body and adapted to actuate the magnetically actuated switch when placed in proximity thereto.

According to an aspect, a flameless candle charging system comprises a plurality of flames candles; a charging tray comprising a tray hollow body having a planar upper and outwardly facing surface on which the plurality of flameless candles may be placed, and a metallic plate positioned within the hollow body; and a remote control for selectively operating the plurality of candles and comprising a body having a magnet positioned therein, whereby the remote control may be magnetically attached to the charging tray by positioning the magnet in proximity to the metallic plate.

According to an aspect, a flameless candle charging system, comprises a plurality of flameless candles each comprising a candle hollow body in which is positioned a light emitting element, a magnet, a conductive coil, a power source, at least one circuit board programmed, structured and/or configured to transmit electricity to the light emitting element and provide energy to the power source, and a normally open switch that is selectively movable to a closed position; a charging tray comprising a tray hollow body having a planar outwardly facing surface on which the plurality of flameless candles may be placed; and a switch actuating magnet positioned within the tray hollow body and operable to move the switch to its closed position by placing the candle containing the switch in proximity to the actuating magnet.

According to an aspect, a method for recharging and actuating a flameless candle having a light emitting source, a rechargeable power source and a magnetic switch housed therein, wherein the light emitting source is operable between an off condition and in any one of a plurality of modes when in an on condition, wherein the recharging uses a candle charging tray having a power input for conducting electricity thereto, an outwardly facing surface on which the flameless candle may be placed and a magnetic actuating spot, the method comprising the steps of placing the candle on the outwardly facing surface of the charging tray; applying power to the power input of the charging tray, wherein the light emitting source automatically goes to its off condition; removing the candle from off of the outwardly facing surface of the charging tray, wherein the light emitting source automatically goes into one of its plurality of modes in its on condition; and selectively changing the mode of the light emitting source by manually passing the candle over the magnetic actuating spot.

According to an aspect, a method for recharging a flameless candle having a light emitting source, a rechargeable power source, a power supply circuit structured, programmed and/or configured to provide power to the rechargeable power supply, and a receiving coil housed therein that is adapted to transmit received electricity to the power supply circuit, wherein the recharging uses a candle charging tray having a power input for conducting electricity thereto, a transmitting coil housed therein and an outwardly facing surface on which the flameless candle may be placed, the method comprising the steps of placing the candle on the outwardly facing surface of the charging tray such that its receiving coil is aligned with the transmitting coil housed within the charging tray; and applying power to the power input of the charging tray, whereby electricity is transmitted to the transmitting coil which in turn wirelessly conducts electricity to the receiving coil.

According to an aspect, a flameless candle, comprises a hollow body; a power source; a light emitting element positioned within the hollow body that is selectively actuable between an off state and any one of a plurality of on states; at least one circuit board programmed, structured and/or configured to transmit electricity to the light emitting element, provide energy to the power source, and cause the light emitting element to change amongst its plurality of on states and its off state; and a magnetic switch housed within the hollow body that is operable between a normally open position and a selectively closed position.

According to an aspect, a charging tray for charging a plurality of flameless candles, comprises a body having an outwardly facing surface on which the plurality of flameless candles may be placed; a plurality of candle charging elements disposed within the body; and a plurality of metallic plates disposed within the body, wherein each of the plurality of metallic plates are positioned adjacent one of the plurality of candle charging elements.

According to an aspect, a charging tray for charging a plurality of flameless candles, comprises a body having an outwardly facing surface on which the plurality of flameless candles may be placed; a plurality of candle charging elements disposed within the body; and a magnet disposed within the body.

According to an aspect, a charging tray for charging a plurality of flameless candles, comprises a body having an outwardly facing surface on which the plurality of flameless candles may be placed; a remote control storage area arranged on the outwardly facing surface; and a metallic plate disposed within the body and in axial alignment with the remote control storage area.

These and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings, in which.

DETAILED DESCRIPTION OF EMBODIMENTS

The present disclosure describes a flameless candle having a magnetic resonance charging coil and a magnetic resonance charging tray on which multiple flameless candles may be positioned for charging. The magnetic coupling of the candle to the charging tray permits the tray to be moved more freely without disrupting the charging operation and restricts foreign non-conforming power supplies from connecting. In addition, inclusion of an integrated circuit in the flameless candle that controls the magnetic resonance charging operation minimizes the complexity of the charging tray.

Figure 1:
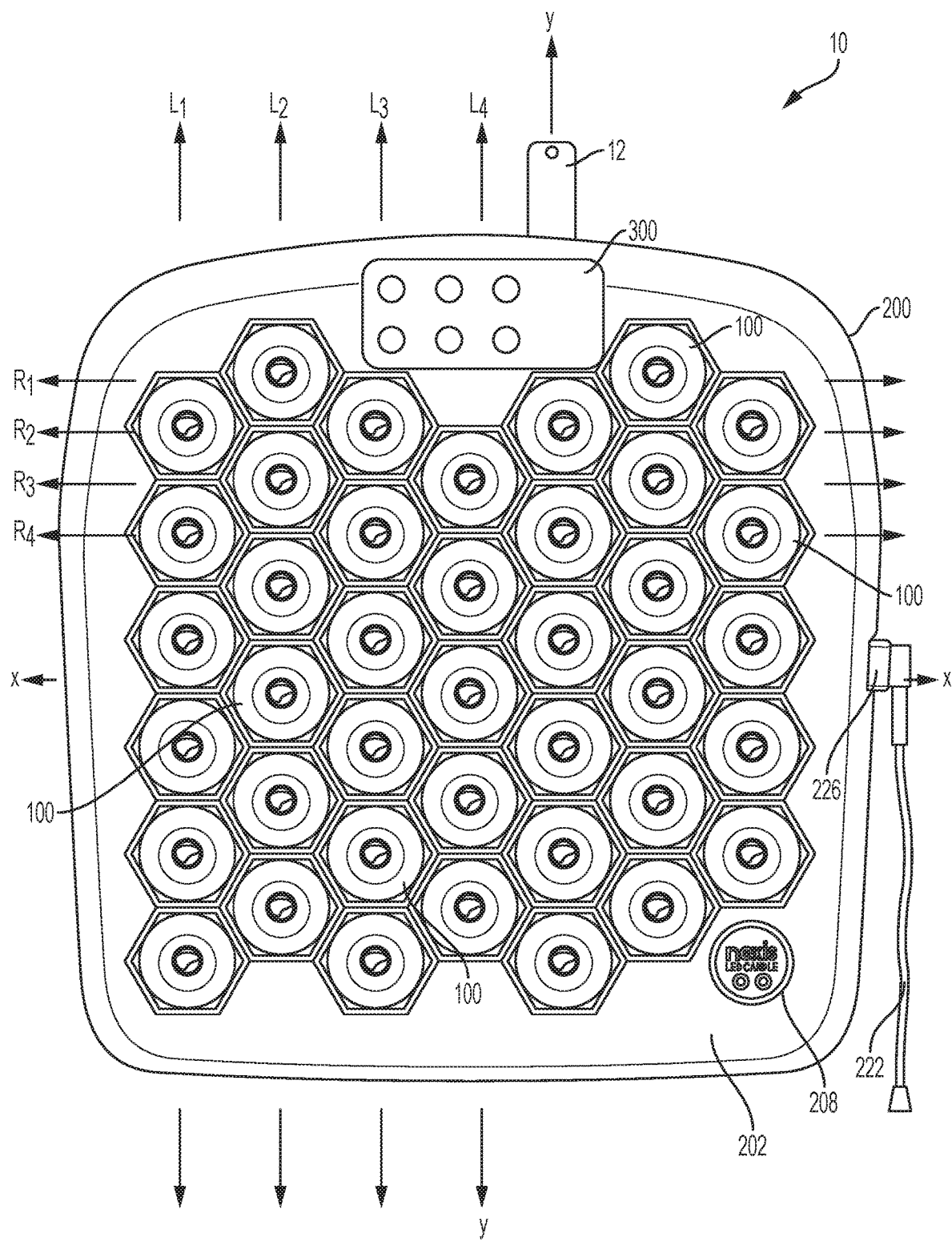
FIG. 1 is a front elevation view of a flameless candle system suspended in a vertical plane, in accordance with an embodiment.
Figure 2:
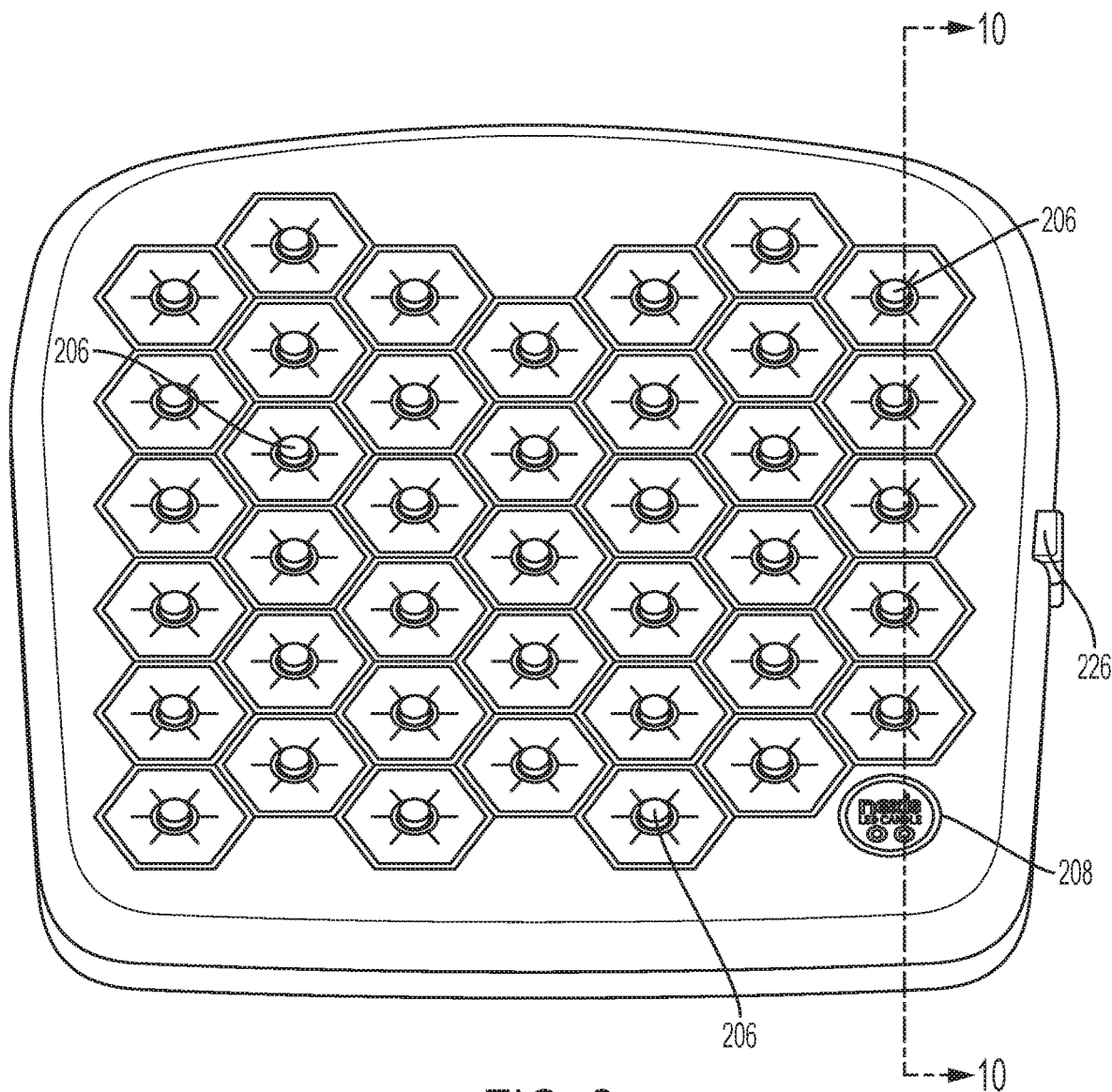
FIG. 2 is a first perspective view of a charging tray, in accordance with an embodiment.
Figure 3:
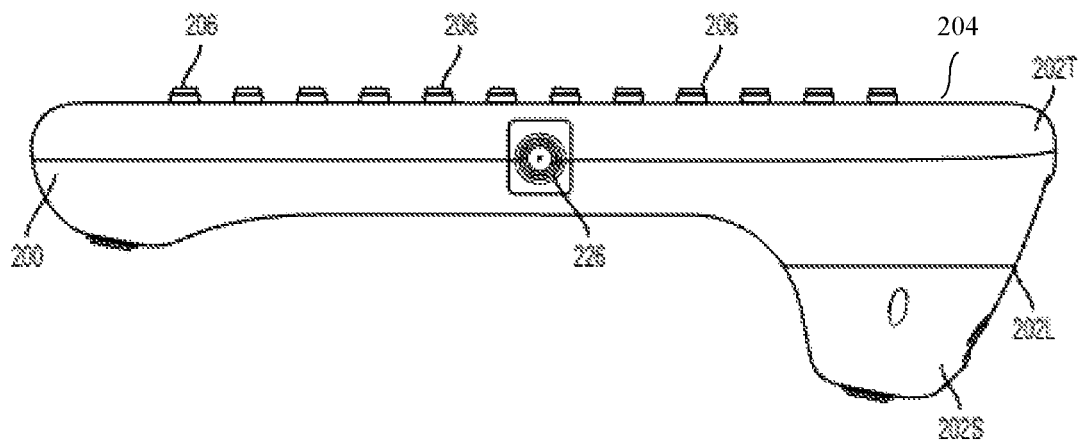
FIG. 3 is a side elevation view of a charging tray, in accordance with an embodiment.
Figure 4:
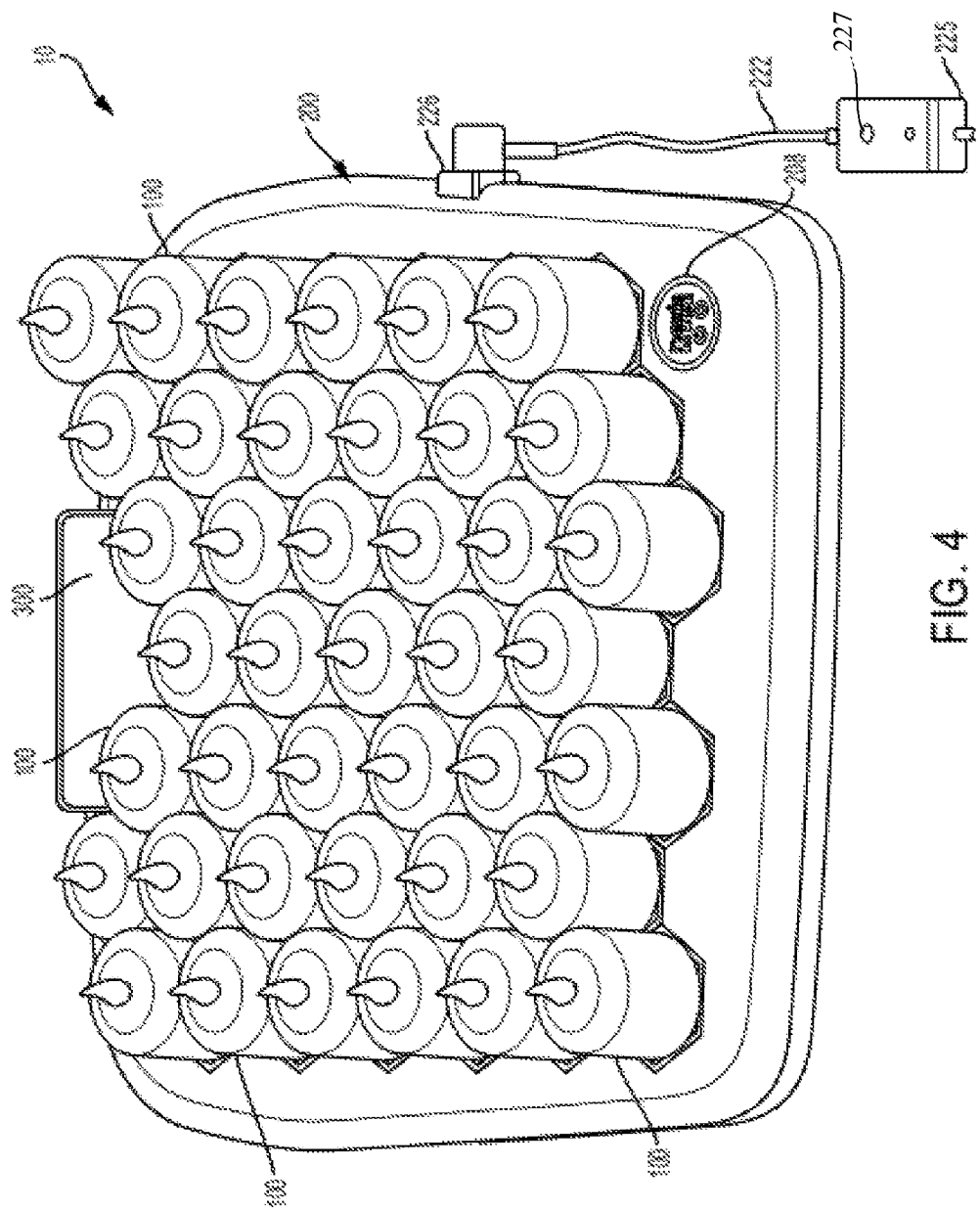
FIG. 4 is a second perspective view of flameless candle system, in accordance with an embodiment.
Figure 5:
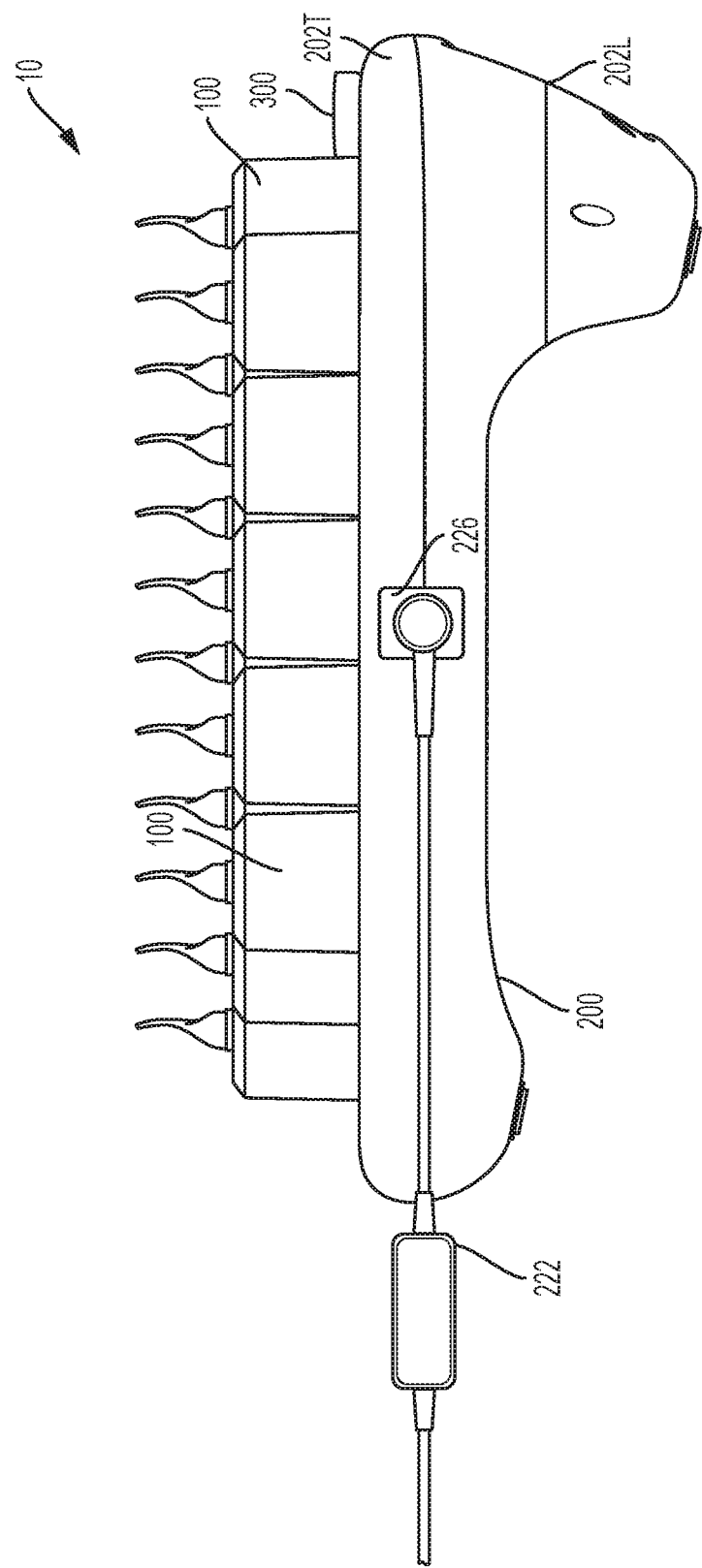
FIG. 5 is a side elevation of a flameless candle system, in accordance with an embodiment.
Figure 6:
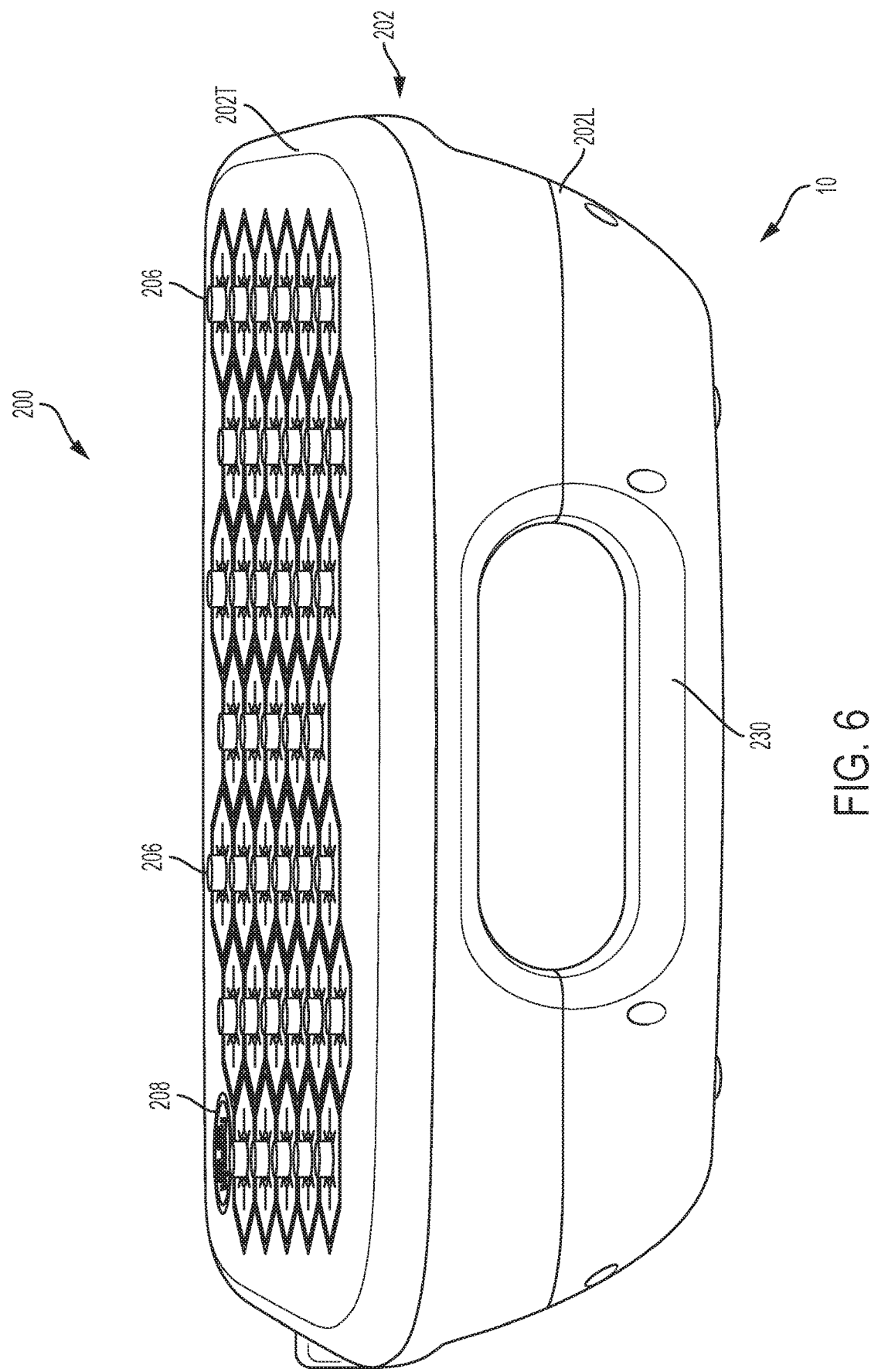
FIG. 6 is an end elevation view of a charging tray, in accordance with an embodiment.
Figure 7:
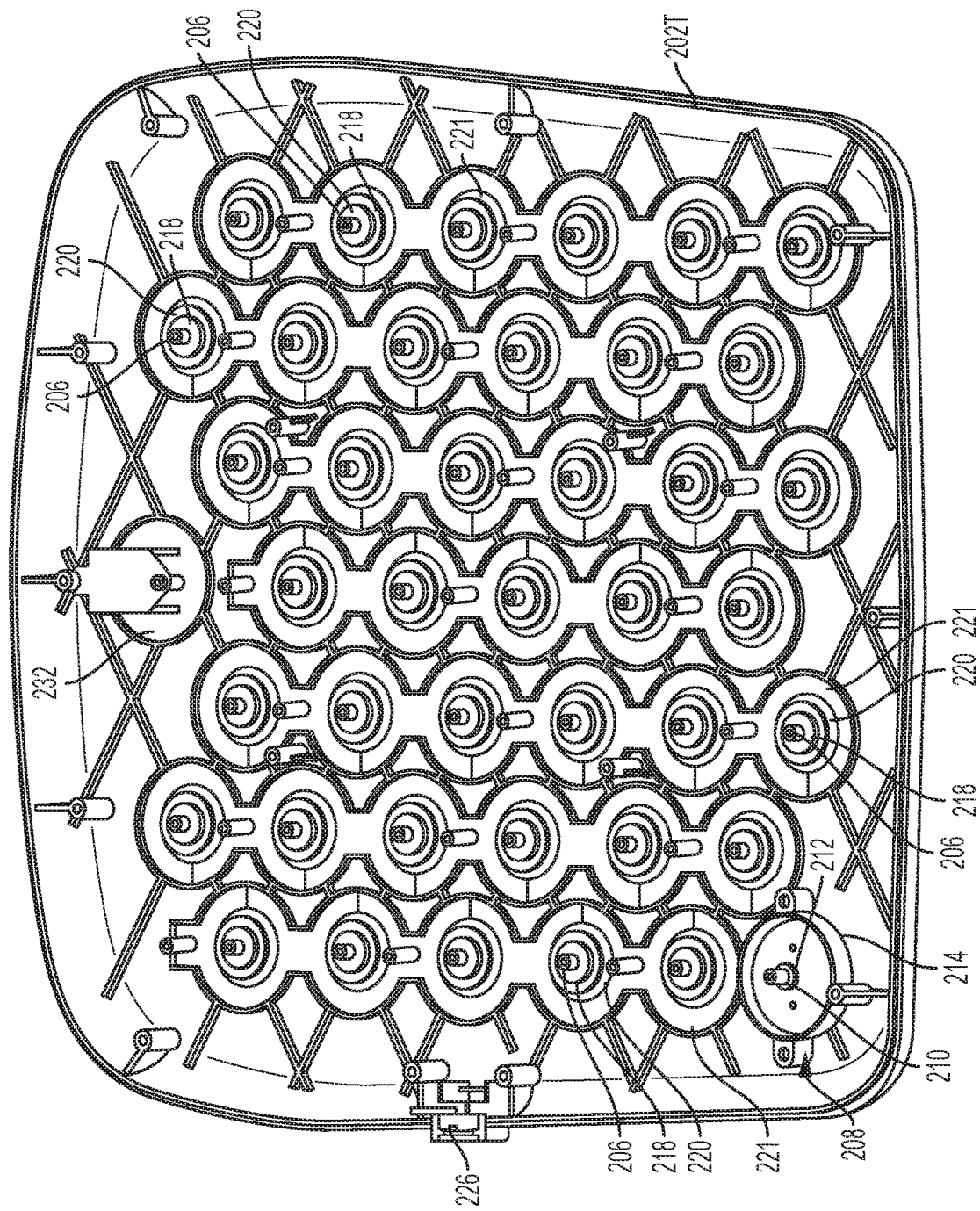
FIG. 7 is a first cross-sectional view showing the interior of the top half of a charging tray, in accordance with an embodiment.

Referring to FIG. 1, in one embodiment, is a flameless candle charging system, designated generally by reference numeral 10, generally comprising flameless candles, each designated generally by reference numeral 100, a charging tray, designated generally by reference numeral 200, on which candles 100 may be placed when not in use/in order to recharge, and a remote control (preferably IR) 300 to remotely operate the candles 100.

Referring specifically to FIGS. 11-14, candle 100 is shown and comprises an outer housing 102 that includes an open bottom 104, a sidewall 106 that extends upwardly from the bottom 104 and integrates with a top 108 that includes an opening 110 formed centrally therethrough. Contained within housing 102 are a plethora of elements that provide candle 100 with the ability to emit light with a variety of features, as well as a power source and circuitry and hardware for recharging of the power source and controlling the light emission.

A support block 112 with a flat outwardly facing surface is securely positioned in covering relation to the open bottom area 104 of candle 100 and is fastened in place via screws 113 or other fasteners that include sealing gaskets 111 at the interface with the exterior thereof to prevent moisture, dust, other debris from infiltrating the inside of candle 100. Support block 112 includes a blind/bored opening 114 formed therein at a central point. Opening 114 provides, as will be described further hereinafter, a point of engagement/locator with charging tray 200. When fastened in place a gasket or sealing ring 115 is sandwiched between a shoulder formed on outer circumference of support block 112 and a corresponding shoulder positioned on the interior of sidewall 106, adjacent the open bottom 104. Gasket 115 provides hermetic sealing to the interior elements of candle 100 to prevent dust, water, and other potentially hazardous matter from infiltrating candle 100.

Immediately and circumferentially surrounding the outer wall of bored opening 114 is a wire winding 116 that serves as the receiver coil that conducts electric current generated by the magnetic field/flux density in the transmitter coil located in the charging tray 200 (as will be explained hereinafter) and is held in place by a retainer 117; receiver coil 116 and the transmitter coil operate in resonance with one another. Positioned above winding 116 is a magnet or magnets 118 that serve to magnetically secure candles 100 to tray 200 (or other metal surfaces). Positioned atop magnets 118 and above but in electrical communication with winding 116 is a printed circuit board (PCB) 120 that includes circuitry printed thereon that has been programmed, structured, and/or configured for providing energy to a battery/power source 122 contained within housing 102 and securely positioned on a battery support 124 that extends above PCB 120. Mounted above battery 122 is a second printed circuit board (PCB) 126 that generally contains circuitry thereon that has been programmed, structured, and/or configured for passing current to a light emitting element (LED) 128 such that LED 128 emits light of a desired color (optional), intensity (bright/dim) and with characteristic (e.g., flickering light, steady/static light). PCB 126 also contains memory that stores the candle's last known setting in terms of its intensity and characteristic as well as a pair of surface mounted indicator lights (LEDs) 125 and 127, one red (to indicate charging) and one green (to indicate fully charged), respectively. A flame-shaped bulb 129 surrounds LED 128 to create the visual impression of a flame when the LED is actuated. A gasket 131 is tightly fit between the wall defining opening 110 and bulb 131 to prevent any dust, water, or other particulate matter from entering the interior of candle 100.

An IR receiver 130 is also positioned atop/surface mounted to and in electrical communication with PCB 126. IR receiver 130 is adapted to receive IR signals from IR remote 300 and transmits those received signals to PCB 126 which, in turn, causes LED 128 to change its state and/or power off/on candle 100 in accordance with the instruction given via the remote 300, as will be described further hereinafter.

Mounted beneath PCB 120 is a magnetic reed switch 132 (see FIG. 13) which serves as an internal on/off switch for candle 100 (and which functions in a normally open condition). Reed switch 132 is operable between on/closed and off/open positions; the on position closes the circuit between PCB 120 and power source 122 permitting current to flow, while the off position opens the circuit such that electrical communication between PCB 120 and power source 122 is broken. Reed switch 132 is actuable via an external magnet. When a magnet is placed near reed switch 132, the switch closes, and when the magnet is removed, the switch returns to its normally open position. Thus, use of an internal reed switch, instead of the conventional external on/off switch achieves certain benefits. First, it serves as a theft deterrent for the candles 100 as the candle itself is only usable with the charging tray 200 which serves as the mechanism for turning the candle fully off. It also automatically turns the candles on when they are lifted from a powered tray 200 and/or power is turned off to tray 200, as described hereinafter.

In reference to FIGS. 1-10, charging tray 200 is shown. Charging tray 200 includes its main body 202 with body halves 202L (lower) and 202T (top) which has a planar upper and outwardly facing surface 204. Body also includes a stand element, 202S, attached to lower half 202L and extending along the top surface; stand element 202S permits the tray to be placed on a table surface and have a slight user facing tilt for the outwardly facing surface 204. Surface 204 includes a series of nubs 206 extending upwardly therefrom (nubs actually extend through an opening in top half 202T) that are arranged in a predetermined pattern, namely, a plurality of parallel columns (Cn) and rows (Rn) wherein alternate rows (R1, R3, etc.) and columns (C1, C3, etc.) are aligned along both X and Y axes, while the adjacent rows (R2, R4, etc.) and columns (C2, C4, etc.) are also aligned with one another but laterally offset along the X-axis from the adjacent rows and columns (e.g., nubs in R1, C1 are laterally offset from nubs in R2, C2, etc.). This creates a honeycomb pattern on which candles 100 may be placed on tray 200 when being charged and makes efficient use of the number of candles in the given amount of space on surface 204. Nubs 206 are used as registration/engagement points with openings 114 in candles 100, thereby providing, as mentioned above, predetermined position for each candle 100 to be placed on tray 200 when charging/not in use. Preferably, nubs 206 are attached to tray 200 with a gasket type fitting or other sealing component in order to prevent any gaps where moisture, debris or other particulate matter could infiltrate tray 200.

Positioned in one corner of surface 204 on charging tray 200 is a magnetic actuating spot 208. A nub is not provided on actuating spot 208, but it is illuminated via a light source 210 that is positioned within body 202 (see FIGS. 7, 8 and 10). In reference to FIGS. 7, 8, and 10 actuating spot 208 comprises a magnet 212 that is positioned within body 202 (top body half 202T) and confined by a support member 214. As will be described hereinafter, by passing a charged candle 10 over actuating spot 208, the magnetic reed switch 132 is magnetically moved from its normally open position to its closed position, and then when the candle is moved away from actuating spot 208, switch 132 automatically returns to its normally open position. When moved from its normally open to its closed position, and as will be described hereinafter, PCB 126 is programmed, configured, or structured to receive current and index LED 128 to its next characteristic state (e.g., flicker dim to flicker bright to off); repeatedly moving candle 100 over actuating spot 208 will repeatedly move the reed switch 132 from its normally open to its closed position and cycle through the candle's characteristic states such that one may swipe the candle across spot 208 until the desired candle state is achieved. Thus, when pulling candles 10 off of tray 200 for purposes of placing them on a table, for example, the user may simply swipe candle 10 over actuating spot 208 in order to cycle the candle through its characteristic states. To turn the candle completely off and prevent any current from flowing to PCB 126, thereby saving battery life, actuating spot 208 must be used (the remote 300 cannot turn the power completely off; it will still permit some current flow to the PCB 126 to power IR sensor 130.)

Figure 8:
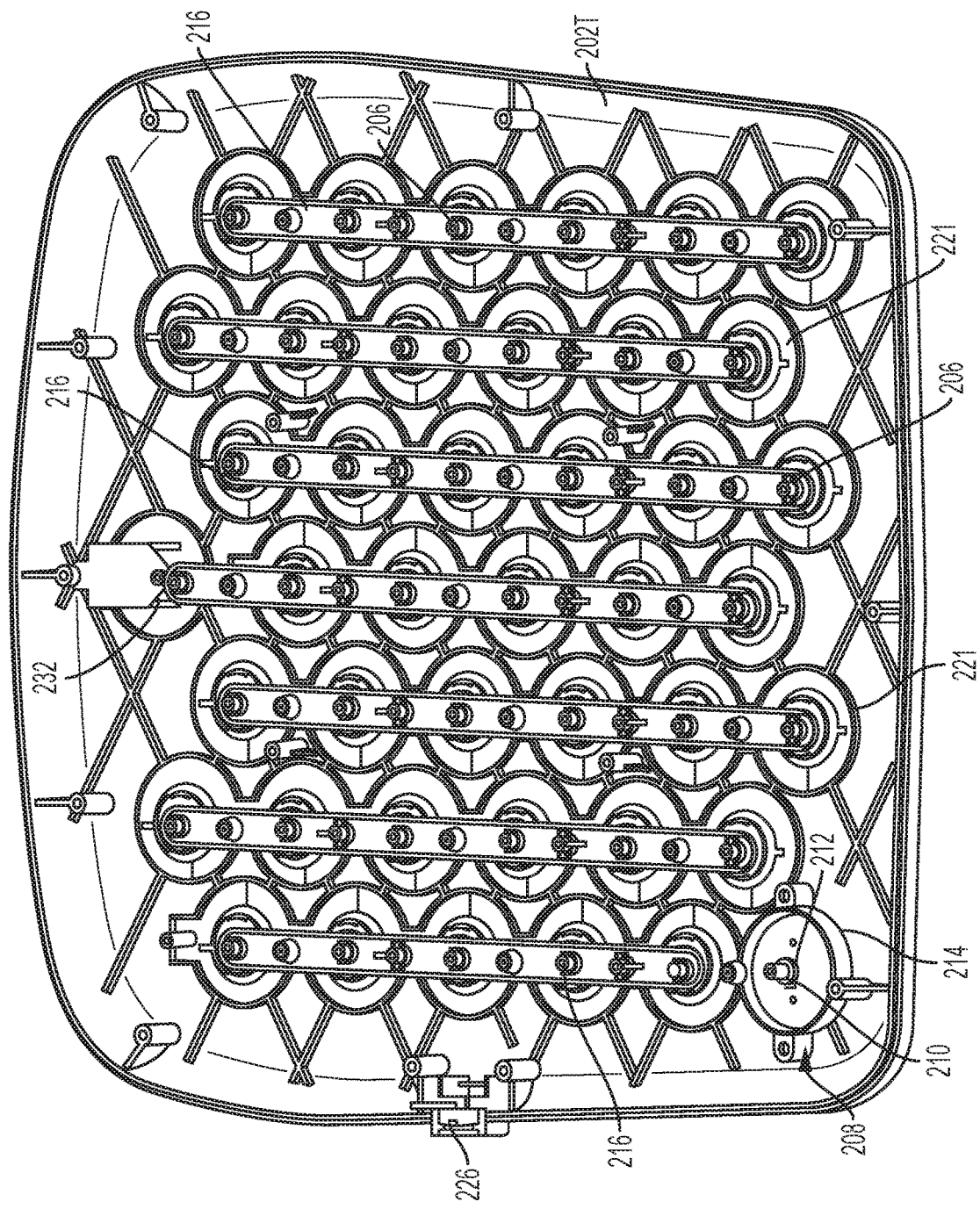
FIG. 8 is a second cross-sectional view showing the interior of the top half of a charging tray, in accordance with an embodiment.
Figure 9:
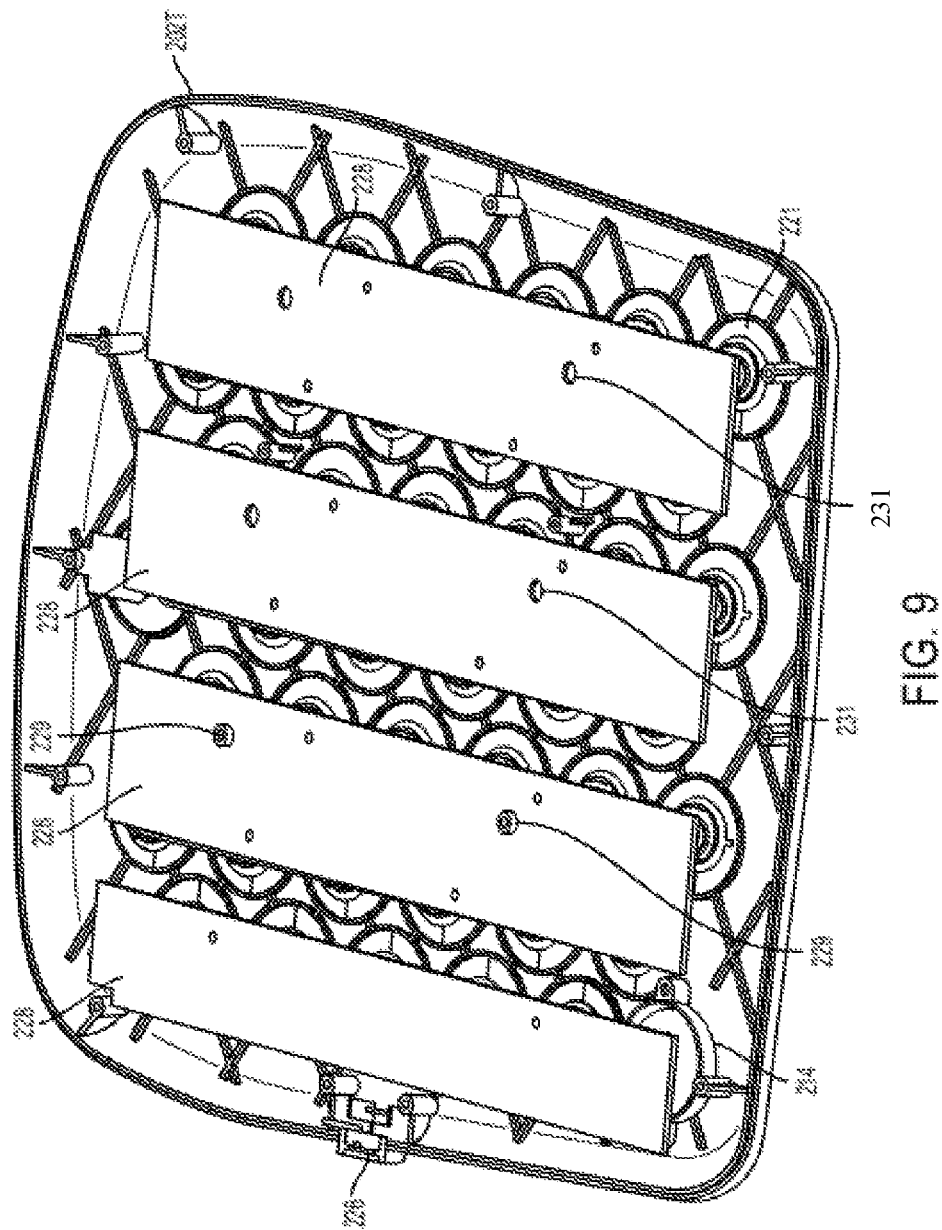
FIG. 9 is a third cross-sectional view showing the interior of the top half of a charging tray, in accordance with an embodiment.
Figure 10:
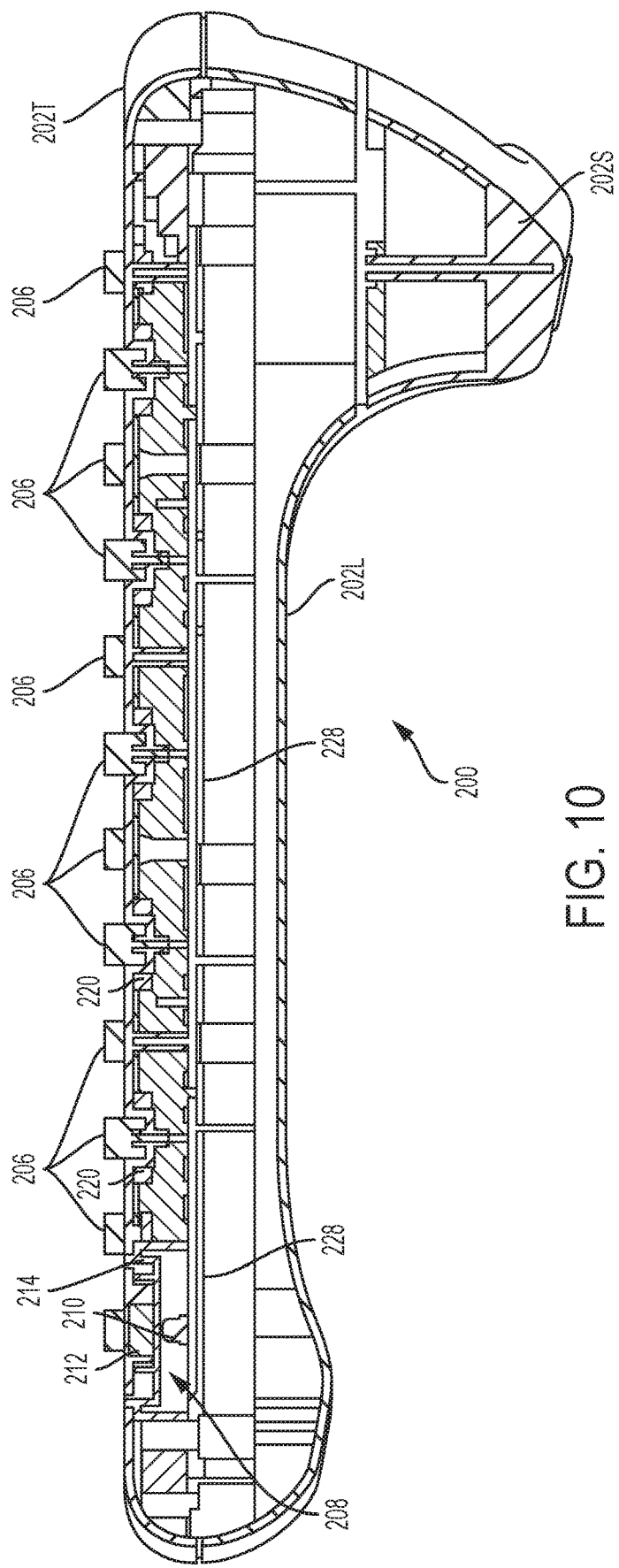
FIG. 10 is a cross-sectional view taken along section line 10-10 of FIG. 2, in accordance with an embodiment.
Figure 11:
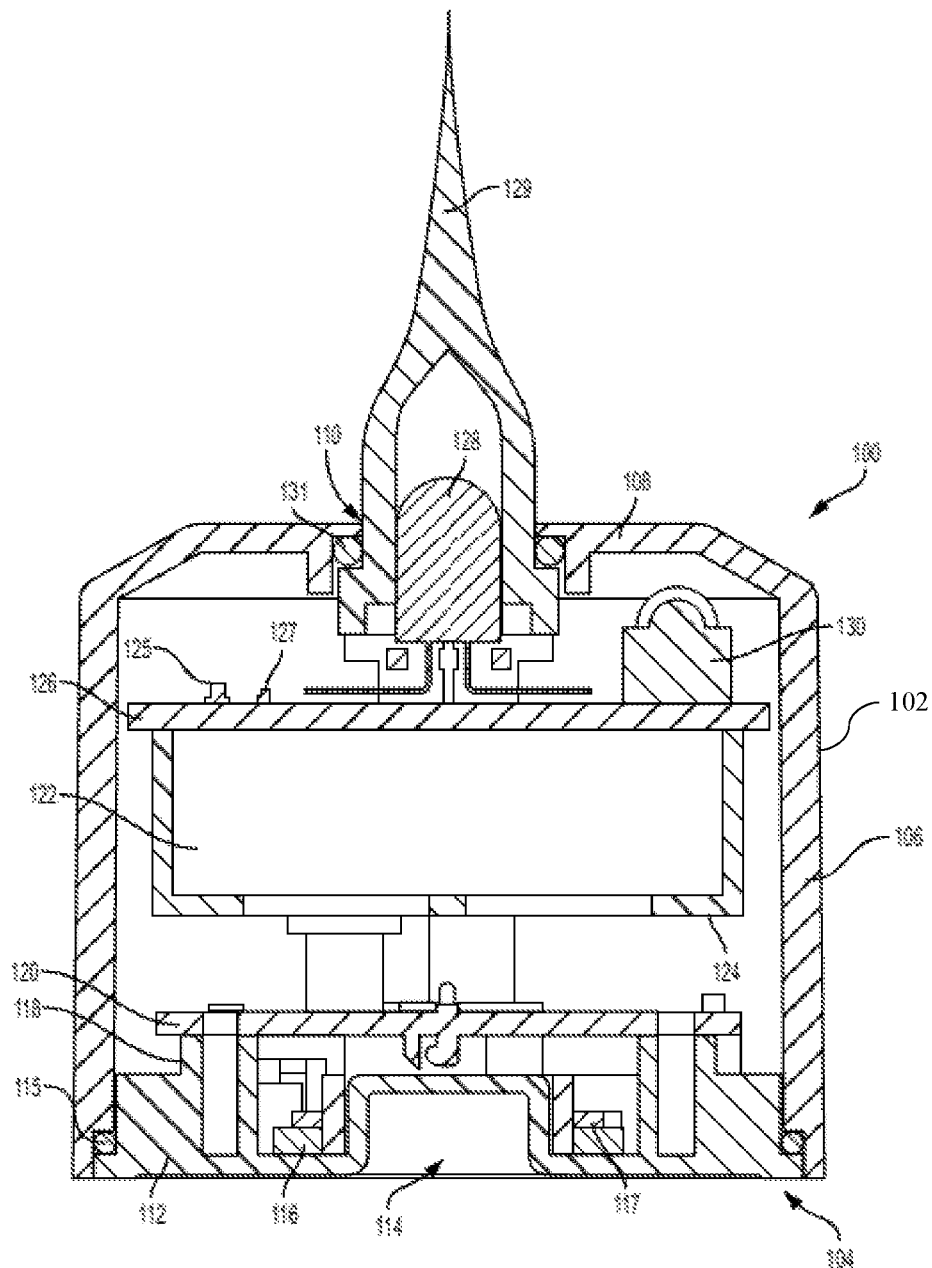
FIG. 11 is a first cross-sectional view of a flameless candle, in accordance with an embodiment.
Figure 12:
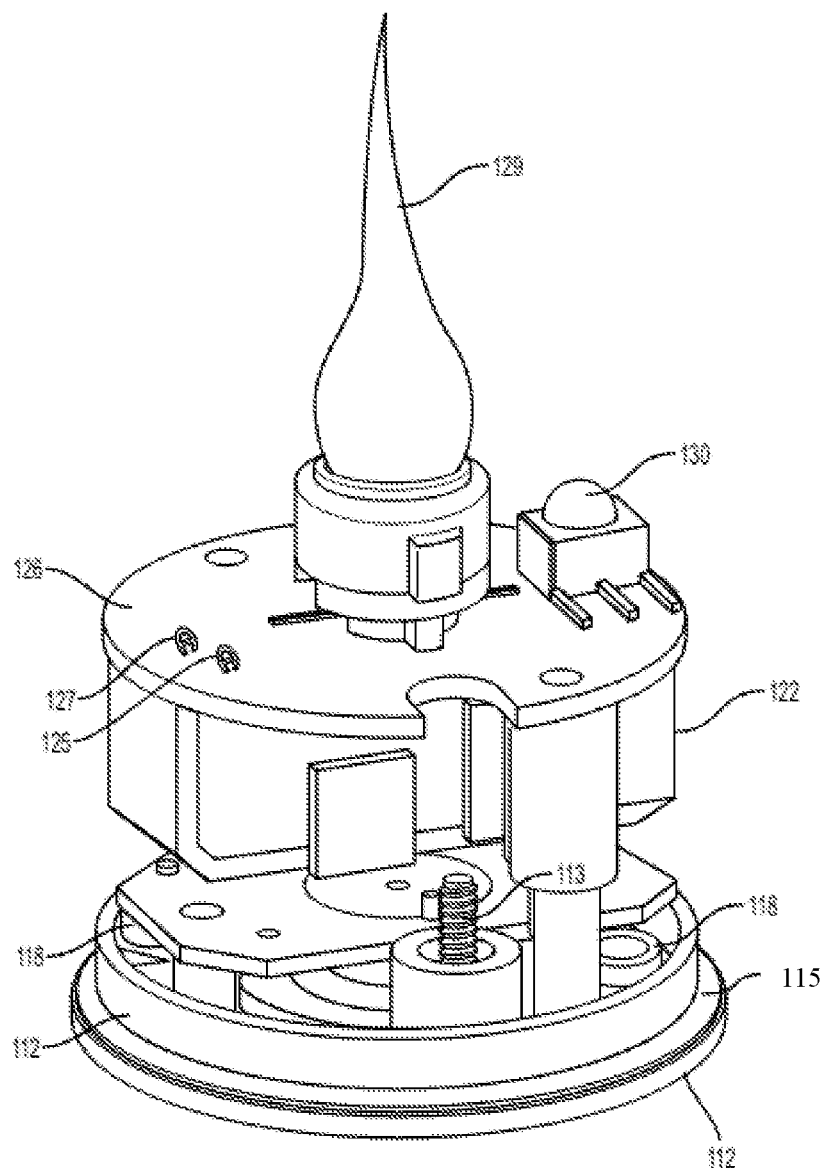
FIG. 12 is a perspective view of certain interior components of a flameless candle, in accordance with an embodiment.
Figure 13:
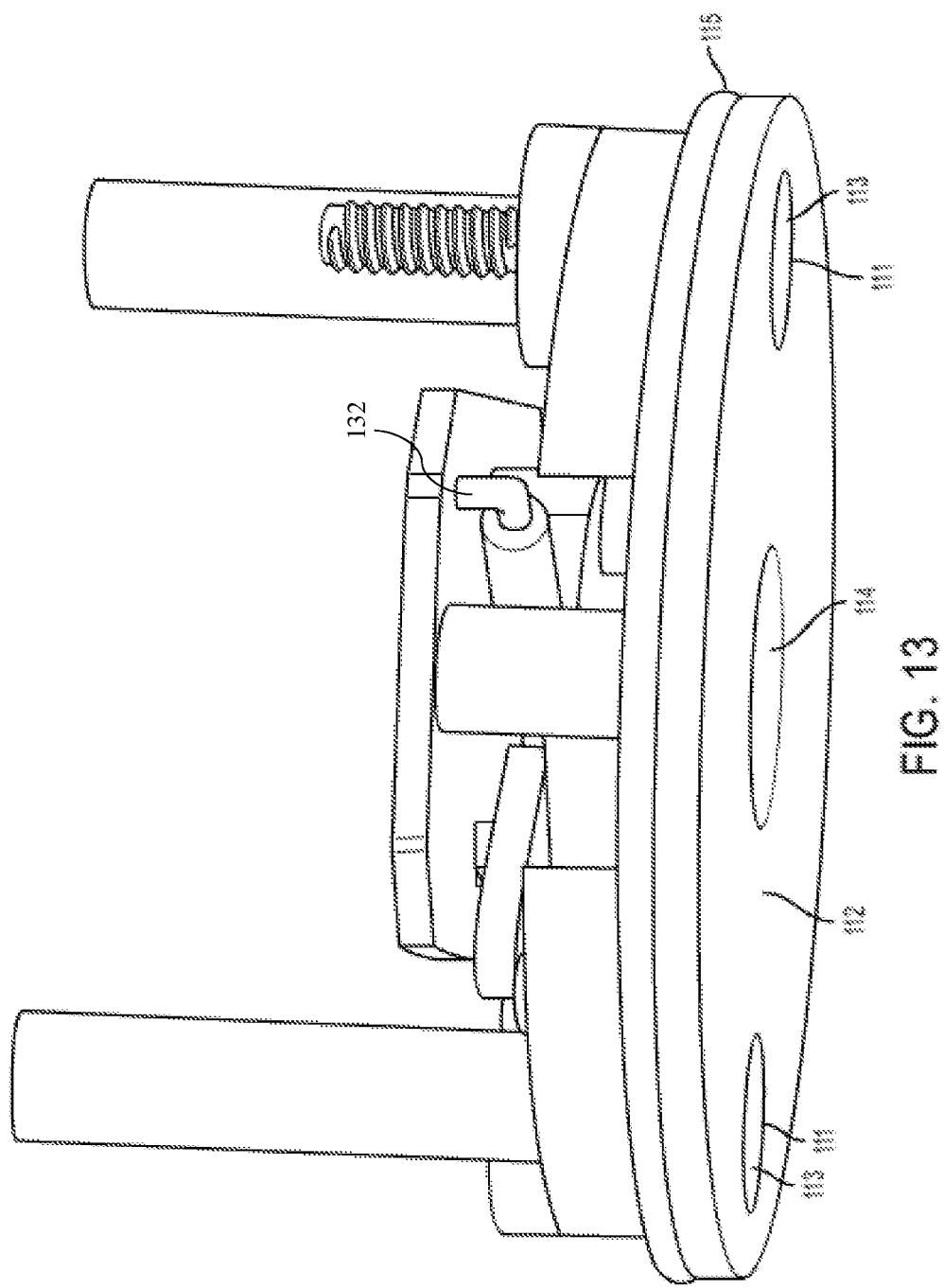
FIG. 13 is a perspective view of certain interior components of a flameless candle, in accordance with an embodiment.
Figure 14:
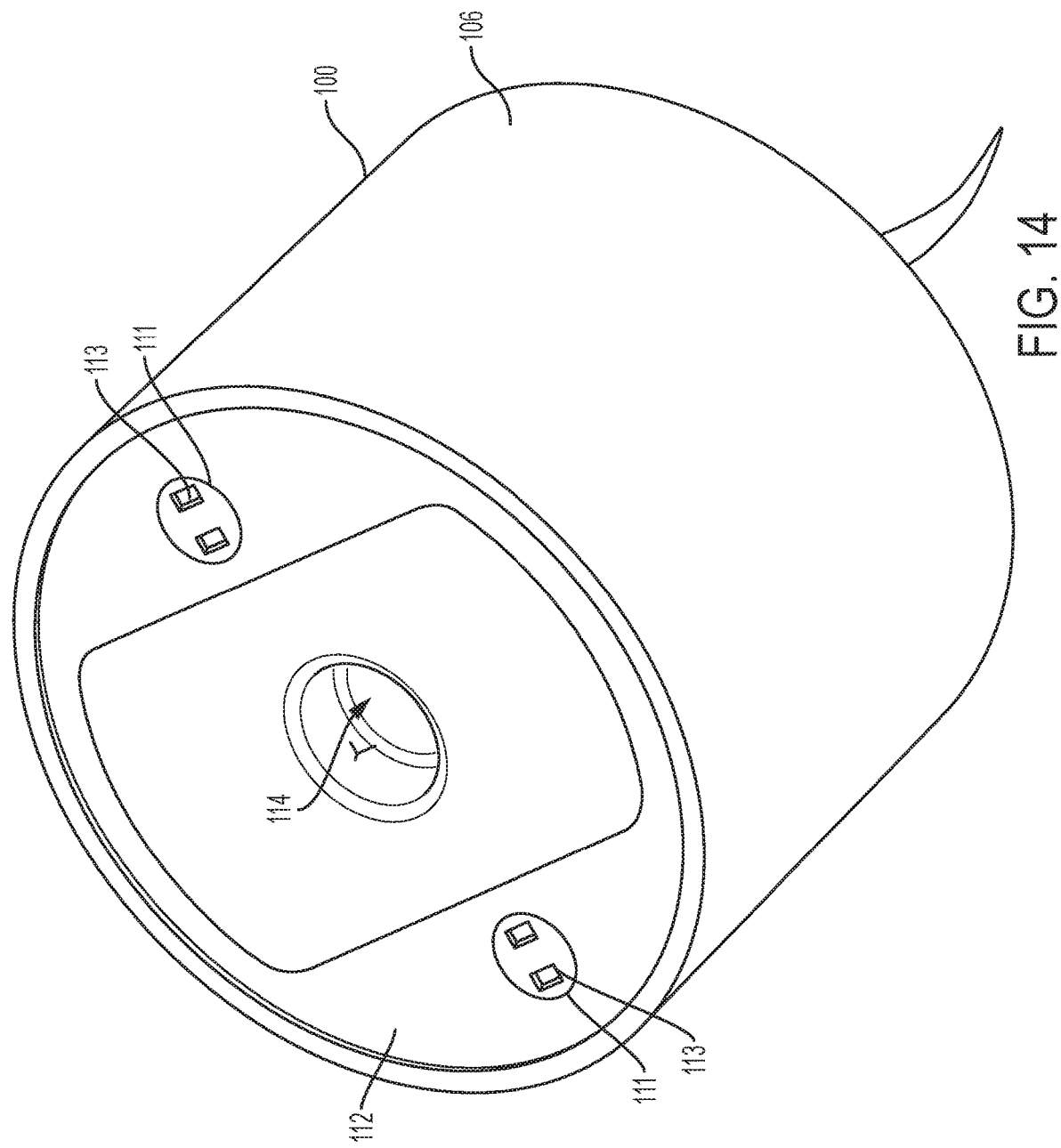
FIG. 14 is a bottom perspective view of a flameless candle, in accordance with an embodiment.
Figure 15:
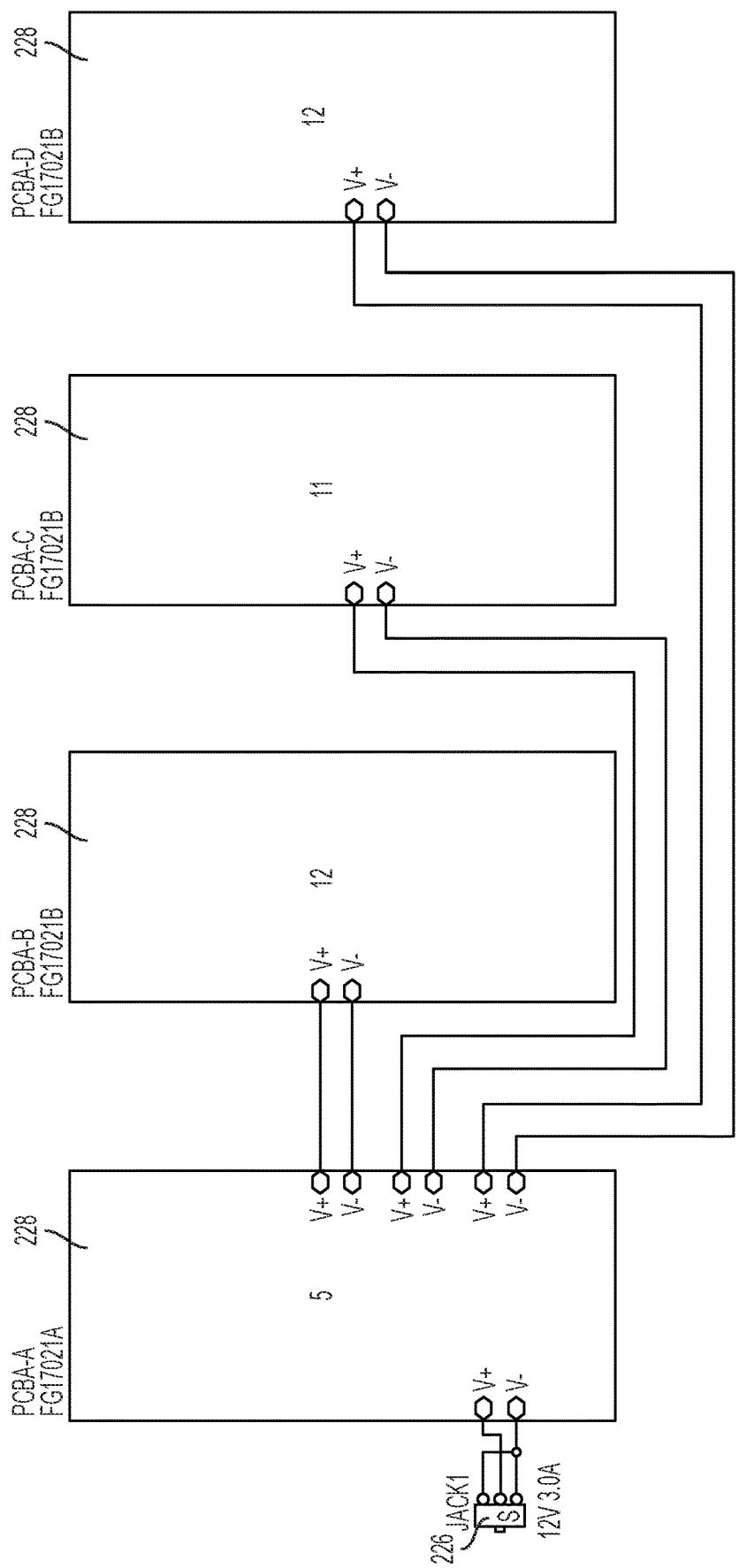
FIG. 15 is a block diagram of a circuit board configuration, in accordance with an embodiment.

Nubs 206 are positioned to permit candles 100 to be charged when placed upon tray 200. With reference to FIG. 8, housed within body 202 are elongated rows of nub supports 216 with a plurality of nubs 206 extending upwardly therefrom. Nub supports 216 are securely attached to a mounting structure within body 202 and further include a coil retainer 218 and conductive transmitting coil 220 securely positioned around each nub 206 and stowed within body 202. A metallic ring 221 is positioned around each coil 220 and provides the ferrite necessary to attract the magnets 118 within candles 100, thereby securely retaining candle 100 to tray 200 when placed thereon. Retainer 218 securely holds coil 220 in position and prevents it from inadvertently moving within tray 200. Thus, when a candle 100 is placed on tray 200 and in registration with a nub 206, so long as electricity is provided to tray 200, as will be described hereinafter, transmitting coils 220 create a magnetic resonance field/flux that is received by the windings 116 in candles 100 and also turns the LED 128 off. It should be noted that nubs 206 (and corresponding openings 114) provide optimal positioning of candles 100 on tray 200, but such positioning is not absolutely required to charge candles; it is simply that the positioned achieved through nubs 206 and openings 114 maximizes the resonance coupling between the transmitting coils 220 and receiving windings 116.

To provide electricity to the charging elements of tray 200, a cable 222 that plugs into an AC power source is provided. Cable 222 includes a magnetic coupling jack 224 that connects to the magnetic coupling port 226 built into tray 200 and an AC plug 225 that plugs into an AC outlet, converts the AC signal to a DC signal and ultimately provides the energy necessary to create the magnetic resonance used to charge candles 100. Cable 22 further includes an indicator light 227 (see FIG. 4) the illuminates when power is being provided to tray 200.

When electricity is provided to the tray 200 via cable 222, the electricity is transmitted to a circuit board; in the preferred embodiment a series of four circuit boards 228 that are daisy chained together are used instead of a single board (see FIGS. 9 and 14), it being understood that any number of boards could be employed for this function. Circuit boards 228 distribute the electricity to the transmitting coils 220, thereby providing the energy necessary to create the magnetic field utilized for the charging operation as previously described. In one aspect the circuit boards are securely engaged (via posts 229 that snappingly engage openings 231 formed in the boards, for example) to overlay either one or two columns each of nubs 206 (and their respective transmitting coils 220 and magnets 218).

Another aspect is that the magnetic attraction between the magnets 118 in candles 100 and the metallic rings 221 in tray 200, permit tray 200 to be stored, even while candles 100 are positioned thereon, in any orientation. Thus, when candles 100 are placed upon tray 200 in axial alignment with the respective charging element (i.e., transmitting coils 220), the magnets 118 in candles 100 and metallic rings 221 in tray 200 create a magnetic connection between the two such that sufficient force is required to remove candle 100 from tray 200 (a force greater than gravity). It should be noted that metallic rings 221 could be in the form of plates or other shape and could be mounted atop surface 204 as well, the aspect encompassing the metallic rings being attached directly or indirectly to tray 200. For example, tray 200 can be suspended in a vertical plane from a hook 12 on a wall without candles 100 falling off of tray 100 due to the force of gravity (see FIG. 1 where tray 200 is suspended in a vertical plane from a hook 12). This aspect of magnetic attraction between candles 100 and tray 200 minimizes the need for table top/shelf space to store the trays. Likewise, a worker can carry tray 200 around by its handle 230 which is ergonomically positioned along the tope edge of tray 200, instead of carrying them like a server tray in a horizontal plane, and remove candles 100 one by one while placing them on tables (or wherever the candles are to be placed for use), without having to worry about the candles 100 falling off of tray 200, thereby enhancing the versatility and ease of use of system 10.

A further aspect is inclusion of a remote control 300, preferably operated in the IR spectrum, which may be used to actuate and/or change the characteristic state or intensity of the candles 100. Thus, remote control 300 includes buttons or other user interfaces thereon that correspond with the various intensities (bright or dim) and characteristics (flicker or static/steady) plus an on/off command. By depressing the desired command, IR sensor 130 will receive the sent signal, transmit it to PCB 126 which, in turn, is programmed, structured and/or configured to cause LED 128 to operate in the manner dictated by the command entered into remote 300.

Remote control 300 is magnetized (either its body can be composed or integrated with magnetic particles or a magnet can be embedded within it) such that it may be magnetically coupled to tray 200 when not in use. Tray includes a metallic plate 232 positioned in its interior in the area axially aligned with the top center (i.e., a remote control attachment area) of the tray and the magnetic portion of IR remote 300 will become magnetically secured to tray 200 when placed in proximity to plate 232; it should be noted that metallic plate 232 could be mounted on top of surface 204 and the aspect that it be attached to tray 200 includes being attached directly or indirectly. This magnetic coupling of the remote control 300 to the tray 200 enhances the versatility of the system 10 and provides a convenient storage option for the remote 300. In fact, remote 300 may be magnetically attached to any metallic surface, such as a refrigerator door, or other metallic object.

Figure 16:
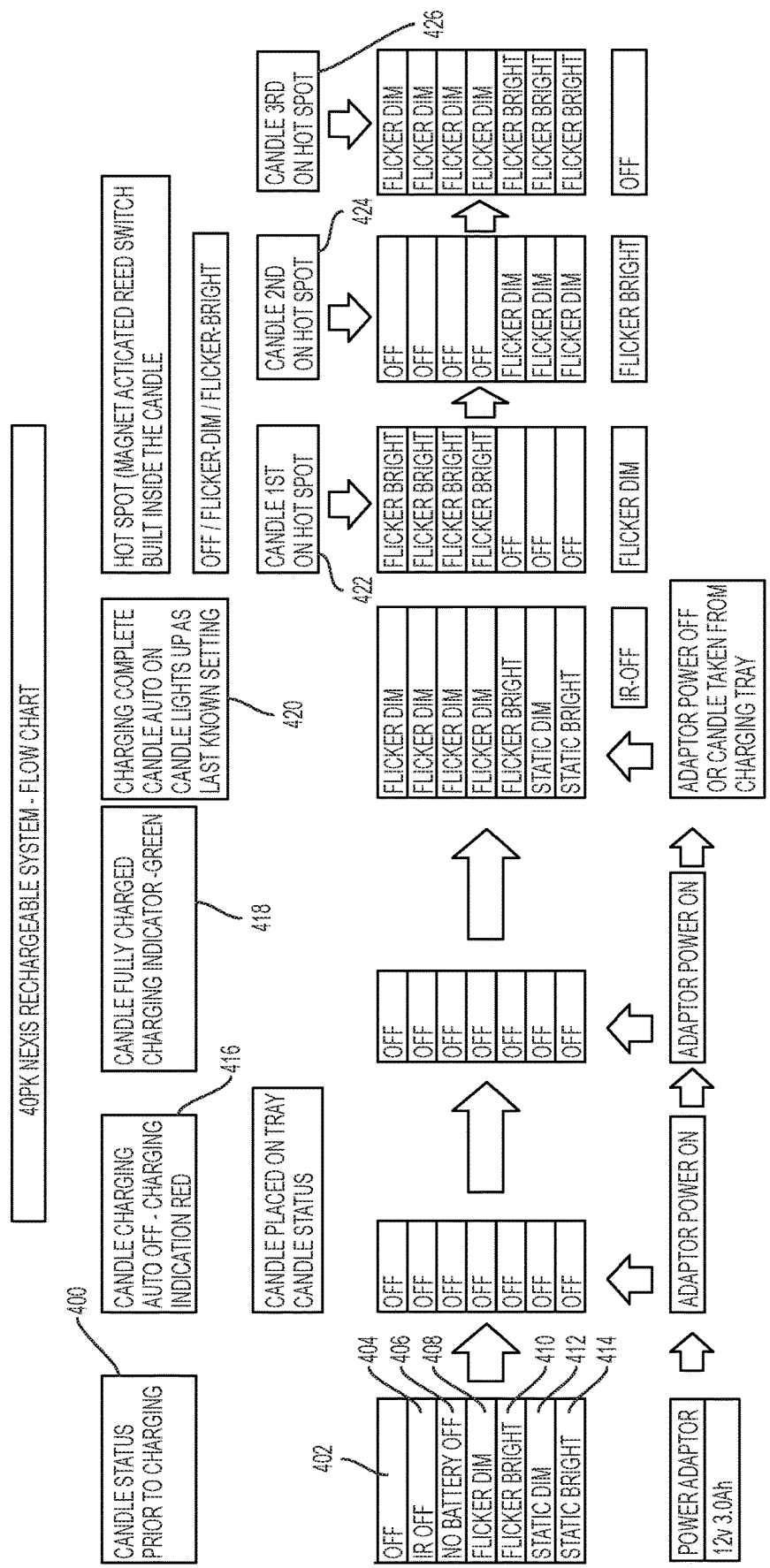
FIG. 16 is a block diagram illustrating the state of a candle at various stages of use, in accordance with an embodiment.

With reference to FIG. 16, various states of candle 100 are described. At an initial state, for example the state of a candle prior to charging is represented in column 400; the modes/states for candle 100 can be in any one of "off" 402, "infrared sensor off" 404, "no battery off" 406, "flicker dim" 408, "flicker bright" 410, "static dim" 412, or "static bright" 414 states. "Flicker/static" refer to a perception of a flickering flame versus a steady/static light discharge, and "bright/dim" refer, of course, to the intensity of the light emitted. "Off" refers to the reed switch 132 being in its off position, "infrared sensor off" refers to the IR sensor 130 being off, and "no battery off" refers to the battery being insufficiently charged. Next, cable 222 is attached to tray 200 and plugged in to an AC power supply and candles 100 are placed on tray 200, as reflected in column 416. This will cause the indicator light 125 to emit red to reflect the charging state, and all possible states of candle 100 will be off while the candles charge. Once the candles are fully charged as reflected in column 418 and power is still being supplied to tray 200, indicator light 127 emits green light to indicate charging is complete and the various states of the candle all remain off. Next, as reflected in column 420 power is turned off to tray 200 and this causes candles 100 to return to the state that they were last at prior to charging (in this example, flicker dim is the first four states, flicker bright, static dim, and static bright are states 5-8.); if the power source 122 was completely drained prior to charging, candle 100 will go to its default state (e.g., a dim flicker state.) Now, as candles 100 are removed from tray, they can be passed over actuating spot 208, as reflected in column 422, to change the state of the candle. The first time a candle is passed over spot 208, as shown in column 422, the states change to the next corresponding state. The second time a candle 100 is passed over spot 208, as shown in column 424, the next corresponding state for the candle is achieved. The third time a candle 100 is passed over spot 208, as shown in column 426, the next corresponding state for the candle is achieved (in the described embodiment only three states are possible: flicker dim, flicker bright, and off and passing over actuating spot 208 will simply cause the candle 100 to go from one of these sates to the next with each pass). This loop can continue indefinitely using actuating spot 208. Each candle can be independently addressed and its state set at whatever state is desired using actuating spot 208. Alternatively, one could simply use remote 300 to place candles 100 into whatever state/mode is desired.

Figure 17A:
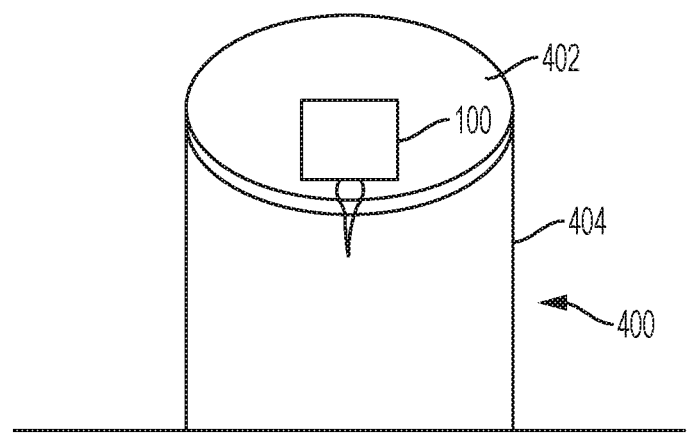
FIGS. 17A and 17B are exemplary illustrations of applications or different mounting/orienting of candles, in accordance with an embodiment.
Figure 17B:
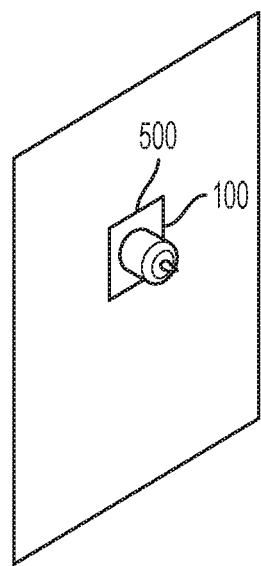

Another aspect of the invention is that the magnets 118 in candles 100 permit the candles to be used in metallic holders are arranged in creative orientations. For example, referring to FIG. 17A, candle holder 400 can include a metallic base 402 and a transparent body 404. Candle 100 can be positioned on metallic base 402 and oriented such that the metallic base is at the top of body 404, creating the visual impression that the candle 100 is suspended within holder 400. Likewise, in FIG. 17B a metallic candle holder 500 may be attached to a wall and candle 100 magnetically attached to holder 500 such that it appears to be suspended off of the wall. Other creative orientations for candles 100 are also enabled as a result of its incorporation of magnets 118 therein. Moreover, this magnetic inclusion in candles 100 permit their use in moving bodies, such as cruise ships, trains, and similar applications where motion may otherwise cause the candles to become displaced.

A further aspect of candles 100 is that when placed on tray 200 and power is applied to tray 200, the LEDs turn off. When power is removed from the tray or the candle is lifted from the tray 200, the PCB 126 is programmed, structured and/or configured to cause each candle 100 to automatically turn on and either return to its last known setting (as stored in memory of PCB 126) or, in the event power source 122 was completely drained prior to charging (in which case the lack of power to PCB 126 will clear its memory), to automatically illuminate in its default state (e.g., dim, flicker mode). Thus, in the event of a power failure, for example, candles 100 will become lit and provide some light. This auto-on aspect of the candles 100 also makes it easier for wait staff or others placing the candles for use insofar as he/she does not have to manually turn each candle on, nor reset the state of the candles (assuming the last desired state is still the desired state; if it is not, the wait staff can either move candle 100 across actuating spot 208 until the desired state is achieved or simply use remote 300 to select the desired state).

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

What is claimed is:

1. A flameless candle charging system, comprising:
   a. a plurality of flameless candles each comprising a candle hollow body in which is positioned a light emitting element, a magnet, a conductive coil, a power source, at least one circuit board configured to transmit electricity to said light emitting element and provide energy to said power source, and a reed switch operable between closed and open positions; and
   b. a charging tray comprising a tray hollow body having a planar outwardly facing surface on which said plurality of flameless candles may be placed, a plurality of transmitting coils disposed therein and arranged in a predetermined pattern within said tray hollow body, wherein each of said plurality of flameless candles is adapted to be positioned in axial alignment with a respective one of said transmitting coils, and a switch actuating magnet positioned within said tray hollow body and operable to move said reed switch between its said open and closed positions when a said flameless candle is placed in proximity thereto.

2. The flameless candle charging system according to claim 1 further comprising a remote control operable to control said plurality of flameless candles.

3. The flameless candle charging system according to claim 2, wherein said charging tray further comprises a remote control mounting area on said outwardly facing surface and a metallic plate disposed within said tray hollow body in axial alignment with said remote control mounting area.

4. The flameless candle charging system according to claim 3, wherein said remote control further comprises a magnet disposed therein, whereby placement of said remote control on said remote control mounting area magnetically attaches said remote control to said charging tray.

5. The flameless candle charging system according to claim 1, wherein said charging tray further comprises a plurality of metallic plates disposed within said tray hollow body and each one of which is positioned adjacent a respective one of said transmitting coils.

6. The flameless candle charging system according to claim 1, wherein said charging tray further comprises a top edge and a handle formed along said top edge.

7. The flameless candle charging system according to claim 1, wherein said charging tray further comprises a plurality of nubs that extend outwardly from said planar surface, each of said nubs being axially aligned with a respective one of said transmitting coils.

8. The flameless candle charging system according to claim 7, wherein said plurality of nubs are arranged in a series of parallel rows and parallel columns, wherein adjacent columns are laterally offset from one another.

9. The flameless candle charging system according to claim 8, wherein each of said plurality of candles further comprise a bottom in which a bored hole is formed, and whereupon when each of said plurality of candles is positioned on said planar surface of said charging tray each of said nubs is adapted to engage a respective one of said bored holes.

10. The flameless candle charging system according to claim 1, further comprising at least one power distribution circuit disposed within said tray hollow body and adapted to distribute power to each of said plurality of transmitting coils.

11. The flameless candle charging system according to claim 10, wherein said charging tray further comprises a charging port incorporated therein and adapted to transmit power to said at least one power distribution circuit.

12. The flameless candle charging system according to claim 11, further comprising a charging cable having an AC plug on one end thereof and a coupling jack adapted to engage with said charging port on its opposite end.

13. The flameless candle charging system according to claim 12, wherein said charging cable further comprises an indicator light that illuminates when power is being supplied to said charging tray.

14. The flameless candle charging system according to claim 12, wherein said coupling jack and said charging port magnetically couple to one another.

15. The flameless candle charging system according to claim 1, wherein each of said plurality of candles further comprises a remote sensor disposed therein.

16. The flameless candle charging system according to claim 1, wherein each of said plurality of candles further comprise at least one indicator lights disposed therein, whereby said at least one indicator lights provide visual indication of the charging status of said candle.

17. The flameless candle charging system according to claim 1, wherein each of said conductive coils and said plurality of transmitting coils are structured to operate at a common resonant frequency.

* * * * *